United States Patent
Chung et al.

(10) Patent No.: US 7,304,468 B2
(45) Date of Patent: Dec. 4, 2007

(54) METHOD AND APPARATUS FOR DETECTING MINUTE OSCILLATION AND WIBRO REPEATER HAVING THE SAME

(75) Inventors: Sung-hyun Chung, Seongnam-si (KR); Min-joong Rim, Seoul (KR); Hyun-uk Shin, Gyeonggi-do (KR)

(73) Assignee: Alogics Co., Ltd. (KR)

( * ) Notice: Subject to any disclaimer, the term of this patent is extended or adjusted under 35 U.S.C. 154(b) by 0 days.

(21) Appl. No.: 11/516,399

(22) Filed: Sep. 6, 2006

(65) Prior Publication Data

US 2007/0075709 A1    Apr. 5, 2007

(30) Foreign Application Priority Data

Sep. 6, 2005    (KR) .................. 10-2005-0082787

(51) Int. Cl.
*G01R 23/00* (2006.01)
*H04B 7/15* (2006.01)

(52) U.S. Cl. .................. 324/76.19; 455/11.1

(58) Field of Classification Search ........... 324/76.19, 324/76.12, 76.11, 76.33, 76.63; 455/7, 11.1, 455/20–22; 331/107 DP
See application file for complete search history.

(56) References Cited

U.S. PATENT DOCUMENTS

| | | | | | |
|---|---|---|---|---|---|
| 4,403,184 | A | * | 9/1983 | Witt et al. | 324/76.22 |
| 5,815,795 | A | * | 9/1998 | Iwai | 455/9 |
| 6,671,638 | B2 | * | 12/2003 | Kitazumi et al. | 702/75 |
| 2002/0119749 | A1 | * | 8/2002 | Oh et al. | 455/11.1 |
| 2005/0272367 | A1 | * | 12/2005 | Rodgers et al. | 455/11.1 |

* cited by examiner

*Primary Examiner*—Vincent Q. Nguyen
*Assistant Examiner*—Hoai-An D. Nguyen
(74) *Attorney, Agent, or Firm*—Cantor Colburn LLP (57) ABSTRACT

Disclosed are a method and apparatus for detecting minute oscillation in a WiBro repeater, and the WiBro repeater having the same. The method of detecting minute oscillation in a WiBro repeater includes: calculating an autocorrelation value of an input signal inputted to the repeater; calculating energy of the input signal; calculating the amount of oscillation by dividing the autocorrelation value by the energy; and comparing the amount of oscillation with a predetermined threshold value to determine whether or not the minute oscillation occurs in the repeater.

13 Claims, 7 Drawing Sheets

METHOD AND APPARATUS FOR DETECTING MINUTE OSCILLATION AND WIBRO REPEATER HAVING THE SAME

BACKGROUND OF THE INVENTION

This application claims the priority of Korean Patent Application No. 2005-82787, filed on Sep. 6, 2005, in the Korean Intellectual Property Office, the disclosure of which is incorporated herein in its entirety by reference.

1. Field of the Invention

The present invention relates to a WiBro system and, more particularly, to a method and apparatus for detecting minute oscillation in a WiBro repeater, and a WiBro repeater having the same.

2. Description of Related Art

A wireless broadband (WiBro) system provides high-data-rate wireless Internet access under the stationary or mobile environment, anytime and anywhere. A currently available mobile phone provides a wide coverage area and high mobility, but fails to provide IP-based high-speed data service efficiently. On the contrary, high-speed Internet and wireless LAN supports the IP-based high-speed data service, but provides a narrow coverage area and low mobility. On the other hand, the WiBro system that provides IP-based content is more economical compared to the mobile phone. Further, the WiBro system can provide a wider coverage area compared to the high-speed Internet or wireless LAN, and is suitable for a mobile communication environment.

In the WiBro system, repeaters are used to eliminate indoor dead spots and to improve service quality in areas where portable Internet services are provided. The repeaters are installed in buildings or in poor service areas between portable subscriber stations (PSS) and radio access stations (RAS) to repeat radio wave so that the service quality can be improved and the dead spots can be eliminated.

Since an input signal is amplified and output by the repeater, the input signal should be sufficiently isolated from an output signal to prevent the output signal from being fed back to the input signal thereby causing oscillation. Oscillation causes the input signal to increase, thereby damaging the repeater. Thus, oscillation should be detected before it occurs, and it should be prevented by reducing amplifier gain. Oscillation occurring due to feedback of part of an output signal to an input signal is referred to as minute oscillation. The minute oscillation should be detected beforehand to prevent the repeater from being damaged.

Figure 1:
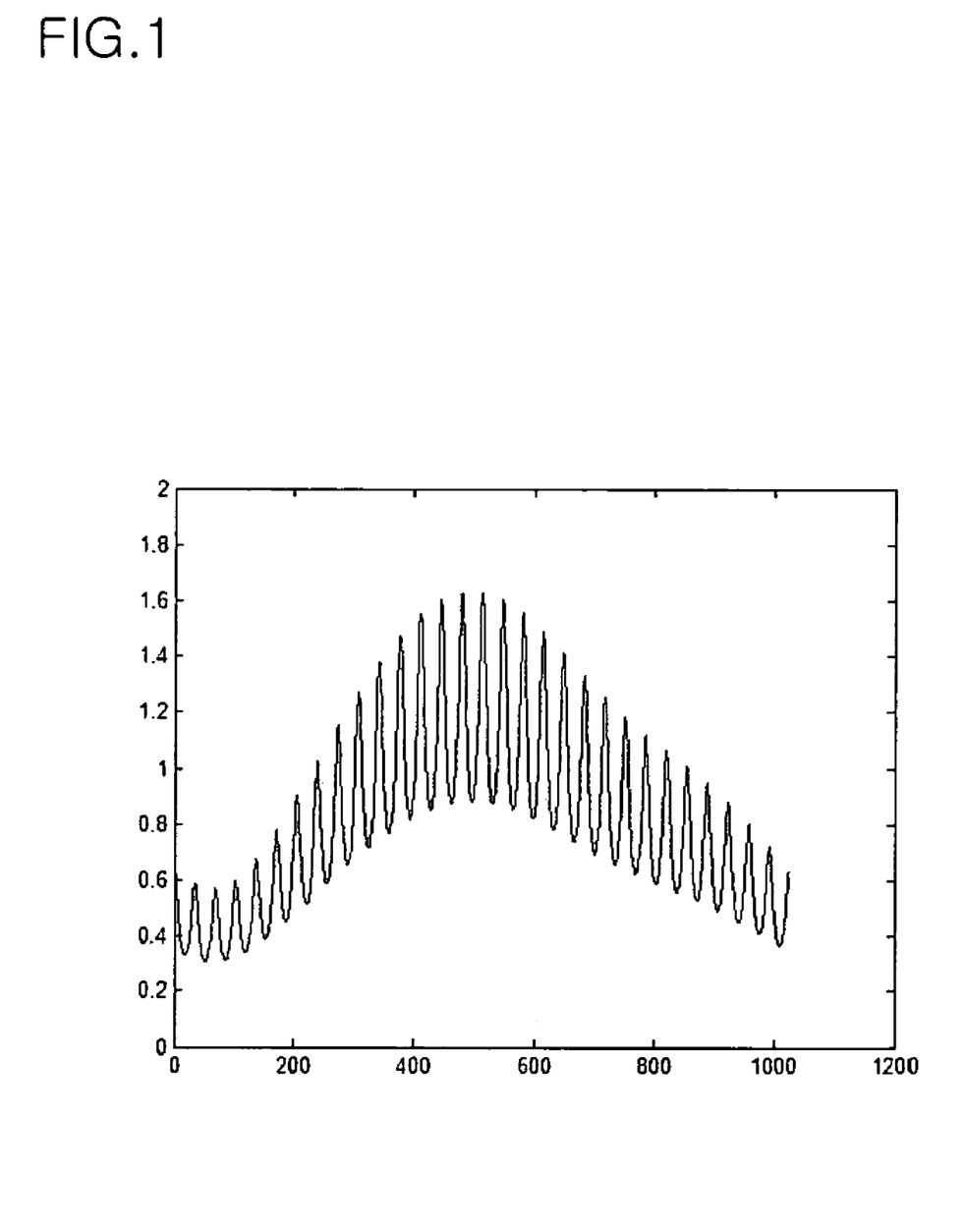
FIG. 1 is a graph showing a spectrum of a fading channel when minute oscillation occurs.

FIG. 1 is a graph showing a spectrum of a fading channel when minute oscillation occurs.

Minute oscillation can be detected by monitoring a spectrum of an output signal and measuring a difference between maximum and minimum values of the spectrum. However, this can be carried out only in a laboratory since a spectrum analyzer is required. In addition, since the difference between the spectrum values is not constant in an actual fading channel as shown in FIG. 1, it is not possible to detect the minute oscillation only by measuring the difference between the spectrum values.

Figure 2:
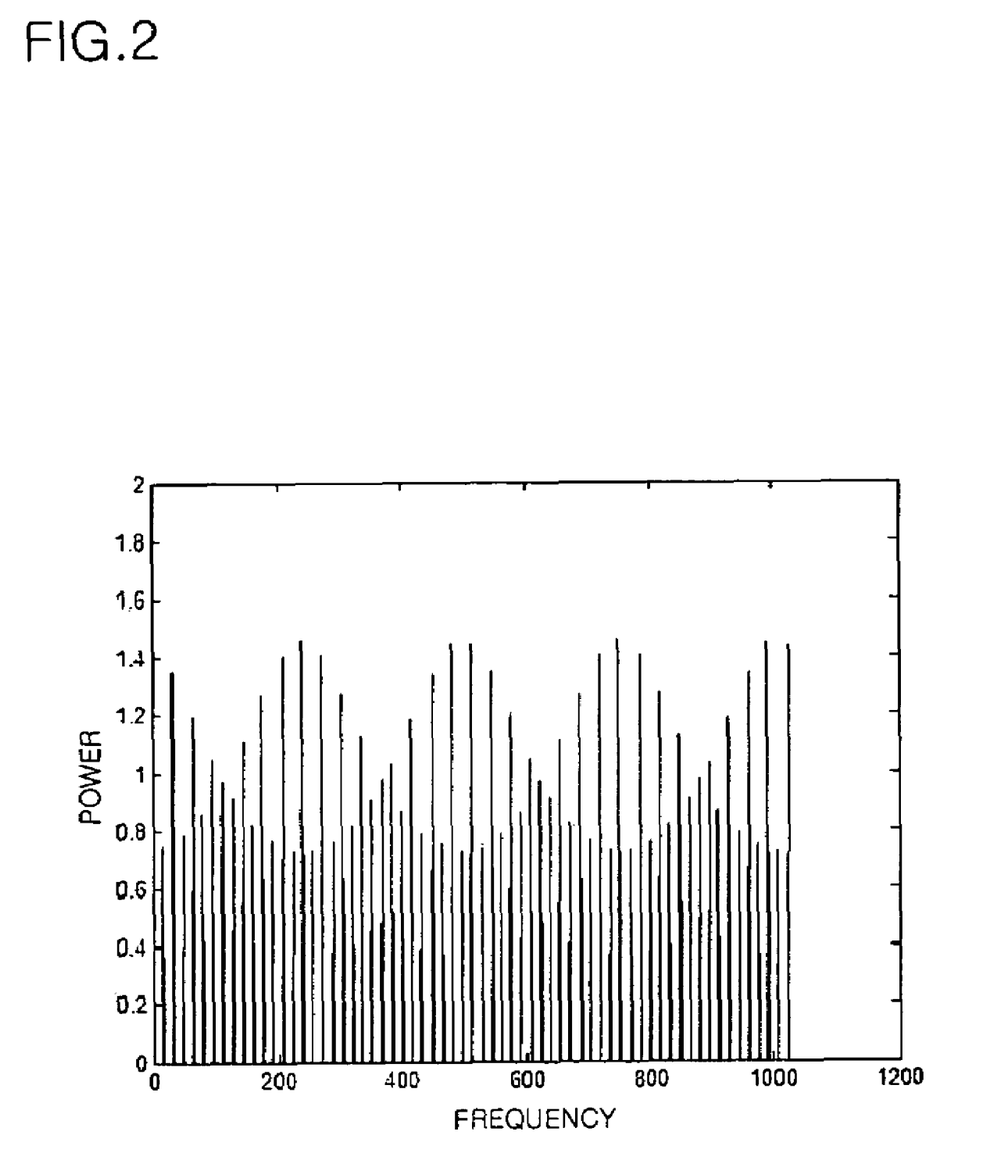
FIG. 2 is a graph showing an OFDMA spectrum when minute oscillation occurs.

FIG. 2 is a graph showing an OFDMA spectrum when minute oscillation occurs.

A WiBro system employs an Orthogonal Frequency Division Multiple Access (OFDMA). OFDMA works by assigning a subset of subcarriers to individual users. Data may be assigned only to some subcarriers. Thus, when data is present only in some subcarriers as shown in FIG. 2, it is not possible to determine whether or not minute oscillation occurs only by monitoring the spectrum.

Meanwhile, another method of detecting the minute oscillation is to extract a multipath and check whether or not there is a multipath corresponding to loop delay. However, the method has a problem that since information concerning a signal inputted to extract the multipath is required, the method can be applied to a signal including a preamble but not to a signal having no defined data, such as an uplink.

SUMMARY OF THE INVENTION

The present invention provides a method and apparatus for detecting minute oscillation in a WiBro repeater even though there is no information concerning input data, and a WiBro repeater having the same.

According to an aspect of the present invention, there is provided a method of detecting minute oscillation in a WiBro repeater, including: calculating an autocorrelation value of an input signal inputted to the repeater; calculating energy of the input signal; calculating the amount of oscillation by dividing the autocorrelation value by the energy; and comparing the amount of oscillation with a predetermined threshold value to determine whether or not the minute oscillation occurs in the repeater.

The operation of calculating an autocorrelation value may calculate the autocorrelation value by using the input signal inputted to the repeater and a delay signal due to a delay in the repeater.

The operation of calculating energy may calculate the energy by calculating an absolute value of a delay signal due to a delay in the repeater.

The operation of calculating energy may calculate the energy by adding a maximum value among absolute values of real and imaginary parts of a complex number, and a value obtained by dividing by a predetermined value a minimum value among the absolute values of real and imaginary parts of the complex number.

In consideration of a plurality of loop delays in the repeater, the operation of calculating an autocorrelation value and energy may calculate the autocorrelation value and energy by receiving a plurality of delayed outputs.

In consideration of the input signal containing a DC value, the operation of calculating energy may calculate the energy and then add an offset value larger than the DC value.

According to another aspect of the present invention, there is provided an apparatus for detecting minute oscillation, including: a shift register; an autocorrelation calculator calculating an autocorrelation value of an input signal inputted to the shift register; an energy calculator calculating energy of the input signal; and a determination unit calculating the amount of oscillation by dividing the autocorrelation value by the energy, and comparing the amount of oscillation with a predetermined threshold value to determine whether or not the minute oscillation occurs in the repeater.

The autocorrelation calculator may calculate the autocorrelation value by using the input signal inputted to the shift register and an output signal obtained from the input signal passing through the shift register.

The energy calculator may calculate the energy by calculating an absolute value of an output signal passing through the shift register.

According to another aspect of the present invention, there is provided a WiBro repeater including the above-mentioned apparatus for detecting minute oscillation.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

Figure 3:
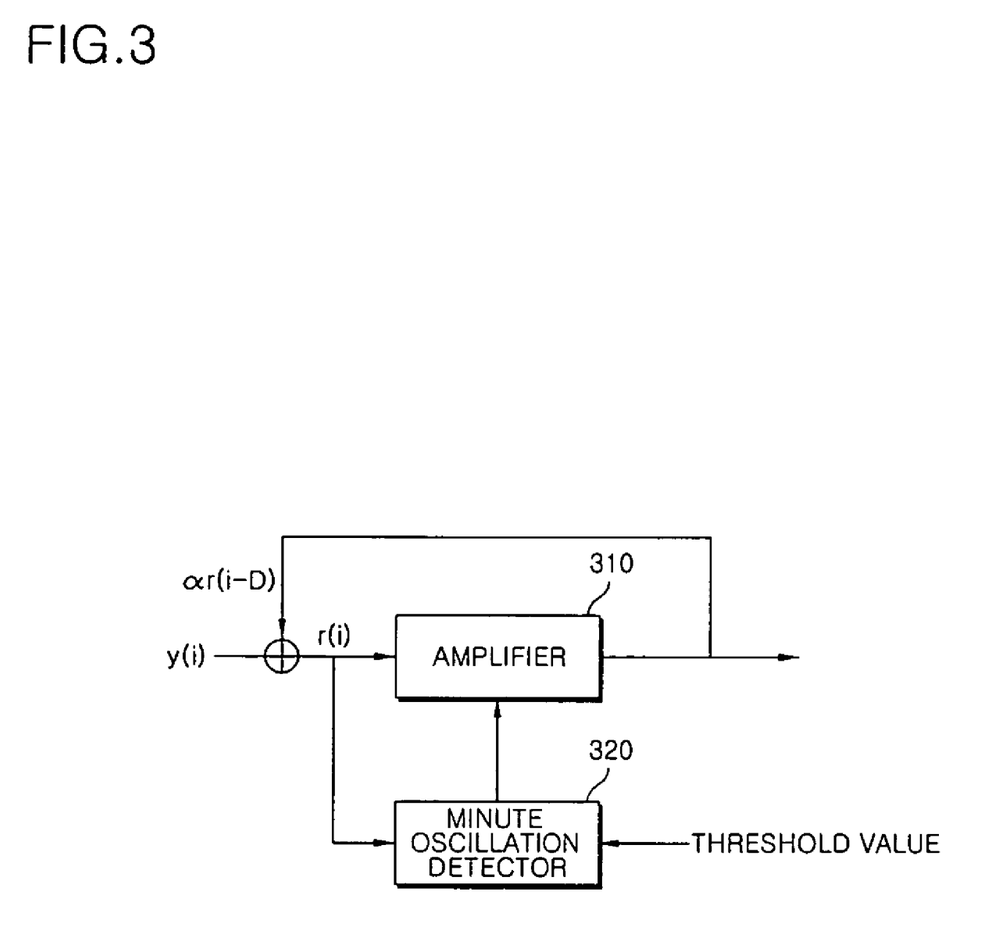
FIG. 3 is a block diagram of a WiBro repeater having a minute oscillation detector according to an embodiment of the present invention.

FIG. 3 is a block diagram of a WiBro repeater having a minute oscillation detector according to an embodiment of the present invention.

A WiBro repeater includes an amplifier 310 and a minute oscillation detector 320. For instance, it is assumed that a signal transmitted from a radio access station (RAS) is denoted by y(i), loop delay in the amplifier 310 is D, loop gain in the amplifier 310 is $\alpha$, and i-th input data inputted to the amplifier 310 is r(i). The term r(i) is expressed by Equation 1 as follows:

$$r(i) = y(i) + \alpha r(i-D) \quad \text{[Equation 1]}$$

In the present invention, loop delay is assumed to be known in a minute oscillation algorithm. The loop delay occurs due to delay in a filter of a repeater or the like. Each repeater has its own loop delay. Under assumption that the loop delay is known, it is possible to determine whether or not minute oscillation occurs by calculating autocorrelation of input data, r(i−D), being off by the loop delay. In Equation 1, the term y(i) is an input signal irrelevant to the minute oscillation, and the amount of oscillation, $\alpha$, should be calculated to detect the minute oscillation. Thus, the amount of oscillation, $\alpha$, is calculated from the following Equation 2 by calculating autocorrelation of the input signal and then dividing the autocorrelation by energy.

$$\frac{\sum r(i)r^*(i-D)}{\sum |r(i-D)|^2} = \frac{\sum (y(i) + \alpha r(i-D))r^*(i-D)}{\sum |r(i-D)|^2} \quad \text{[Equation 2]}$$

$$= \frac{\sum \left( y(i)r^*(i-D) + \alpha r(i-D)r^*(i-D) \right)}{\sum |r(i-D)|^2}$$

-continued $$= \frac{\sum y(i)r^*(i-D)}{\sum |r(i-D)|^2} + \frac{\sum \alpha r(i-D)r^*(i-D)}{\sum |r(i-D)|^2}$$

$$\approx \frac{\alpha \sum |r(i-D)|^2}{\sum |r(i-D)|^2}$$

$$= \alpha$$

In Equation 2, since y(i) and r(i−D) are not correlated to each other, the term $\Sigma y(i)r^*(i-D)$ is assumed to be small in relation to the term $\Sigma|r(i-D)|^2$. It is determined whether or not minute oscillation occurs by comparing the amount of oscillation with a threshold value. If the minute oscillation is determined to have occurred, gain of the amplifier 310 should be reduced so as to prevent oscillation from being occurring.

Figure 4:
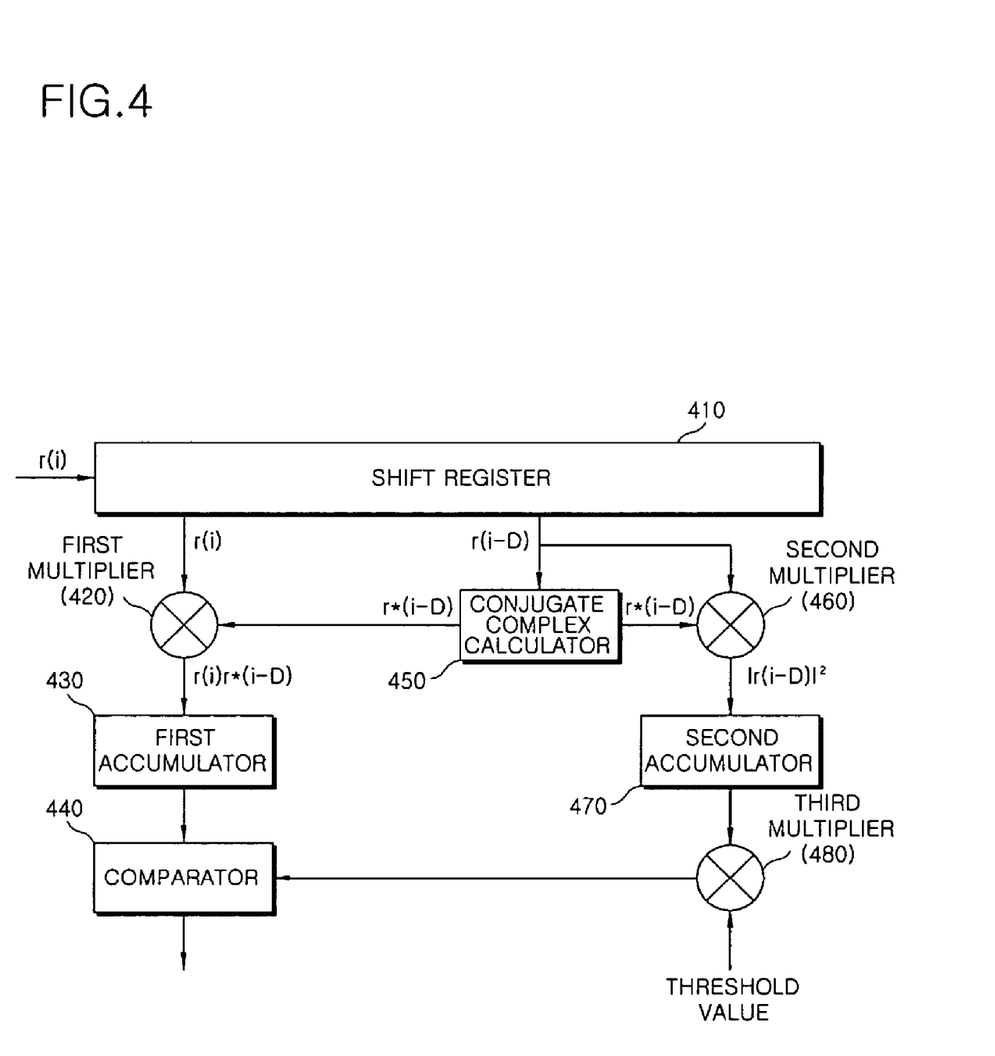
FIG. 4 is a block diagram of a first embodiment of a minute oscillation detector according to an embodiment of the present invention.

FIG. 4 is a block diagram of a first embodiment of a minute oscillation detector according to an embodiment of the present invention.

The minute oscillation detector detects according to Equation 2 whether or not minute oscillation occurs. The minute oscillation detector includes a shift register 410, a first multiplier 420, a first accumulator 430, a comparator 440, a conjugate complex number calculator 450, a second multiplier 460, a second accumulator 470, and a third multiplier 480.

When the signal r(i) is input to the shift register 410, the shift register 410 outputs the signal r(i) and the signal r(i−D) that is loop-delayed. The conjugate complex number calculator 450 calculates a conjugate complex number, r*(i−D), of the signal r(i−D). The first multiplier 420 and the first accumulator 430 calculate an autocorrelation value $\Sigma r(i)r^*(i-D)$. The first multiplier 420 and the first accumulator 430 are collectively referred to as an autocorrelation calculator.

The second multiplier 460 and the second accumulator 470 calculate the energy $\Sigma|r(i-D)|^2$. The conjugate complex number calculator 450, the second multiplier 460, and the second accumulator 470 are collectively referred to as an energy calculator. The amount of oscillation is calculated by comparing the autocorrelation value and energy with the threshold value. That is, after the third multiplier 480 multiplies the energy by the threshold value, the comparator 440 compares it with the autocorrelation value to calculate the amount of oscillation, $\alpha$.

Figure 5:
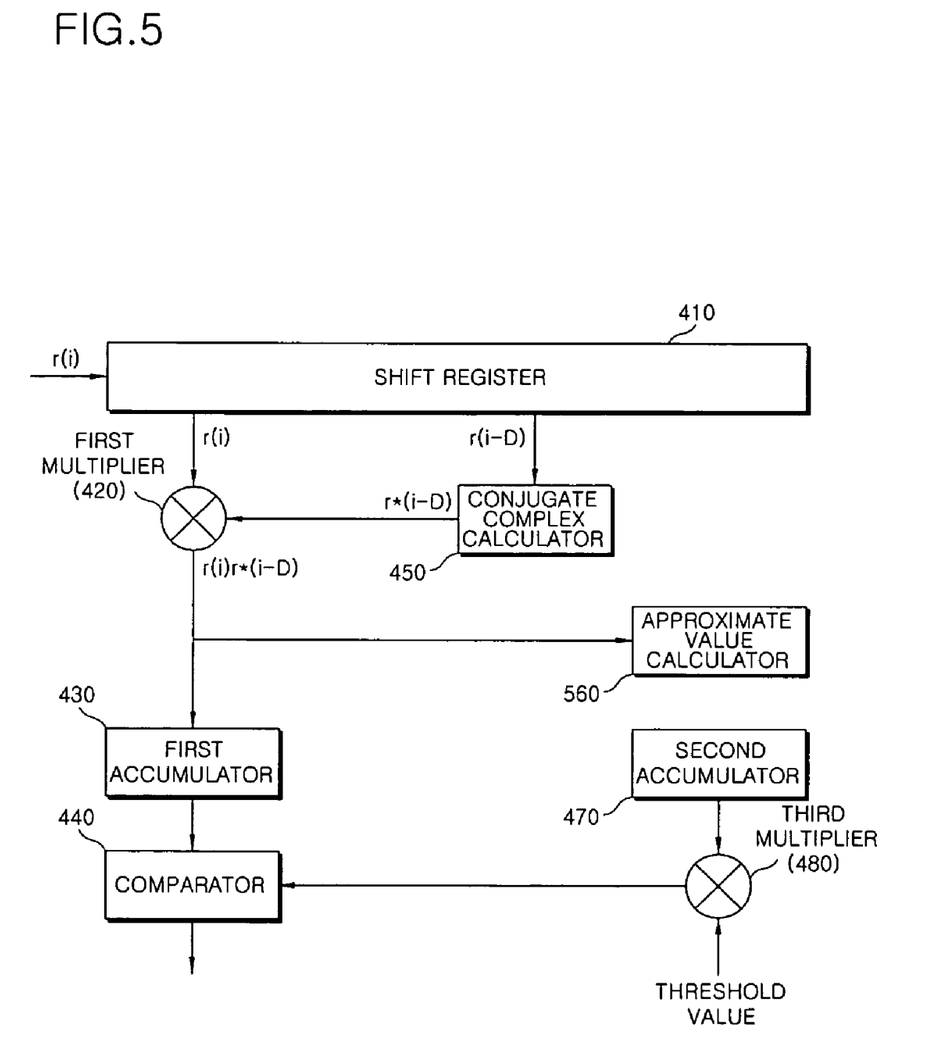
FIG. 5 is a block diagram of a second embodiment of a minute oscillation detector according to an embodiment of the present invention.

FIG. 5 is a block diagram of a second embodiment of a minute oscillation detector according to an embodiment of the present invention.

Referring to Equation 2 and FIG. 4, the minute oscillation detector 320 uses the two multipliers 420 and 460. Equation 2 is modified into Equation 3 to reduce the number of multipliers.

$$\frac{\sum r(i)r^*(i-D)}{\sum |r(i-D)r^*(i-D)|} = \frac{\sum (y(i) + \alpha r(i-D))r^*(i-D)}{\sum |(y(i) + \alpha r(i-D))r^*(i-D)|} \quad \text{[Equation 3]}$$

$$= \frac{\sum \left( y(i)r^*(i-D) + \alpha r(i-D)r^*(i-D) \right)}{\sum \left| y(i)r^*(i-D) + \alpha r(i-D)r^*(i-D) \right|}$$

-continued $$= \frac{\sum y(i)r^*(i-D) + \alpha \sum |r(i-D)|^2}{\sum |y(i)r^*(i-D) + \alpha|r(i-D)|^2|}$$

$$= \frac{\sum y(i)r^*(i-D)}{\sum |y(i)r^*(i-D) + \alpha|r(i-D)|^2|} +$$

$$\frac{\alpha \sum |r(i-D)|^2}{\sum |y(i)r^*(i-D) + \alpha|r(i-D)|^2|}$$

$$\approx \frac{\alpha \sum |r(i-D)|^2}{\sum |y(i)r^*(i-D) + \alpha|r(i-D)|^2|}$$

$$\approx \alpha$$

In Equation 3, an absolute value can be approximated as expressed in Equation 4.

$$|I + jQ| = \sqrt{(I^2 + Q^2)} \approx \max\{|I|, |Q|\} + \frac{\min\{|I|, |Q|\}}{4} \quad \text{[Equation 4]}$$

An approximate value calculator 560 calculates the amount of oscillation, α, based on Equations 3 and 4. The approximate value calculator 560 calculates an absolute value of a complex number based on Equation 4. Other components are the same as those of the minute oscillation detector shown in FIG. 4.

Figure 6:
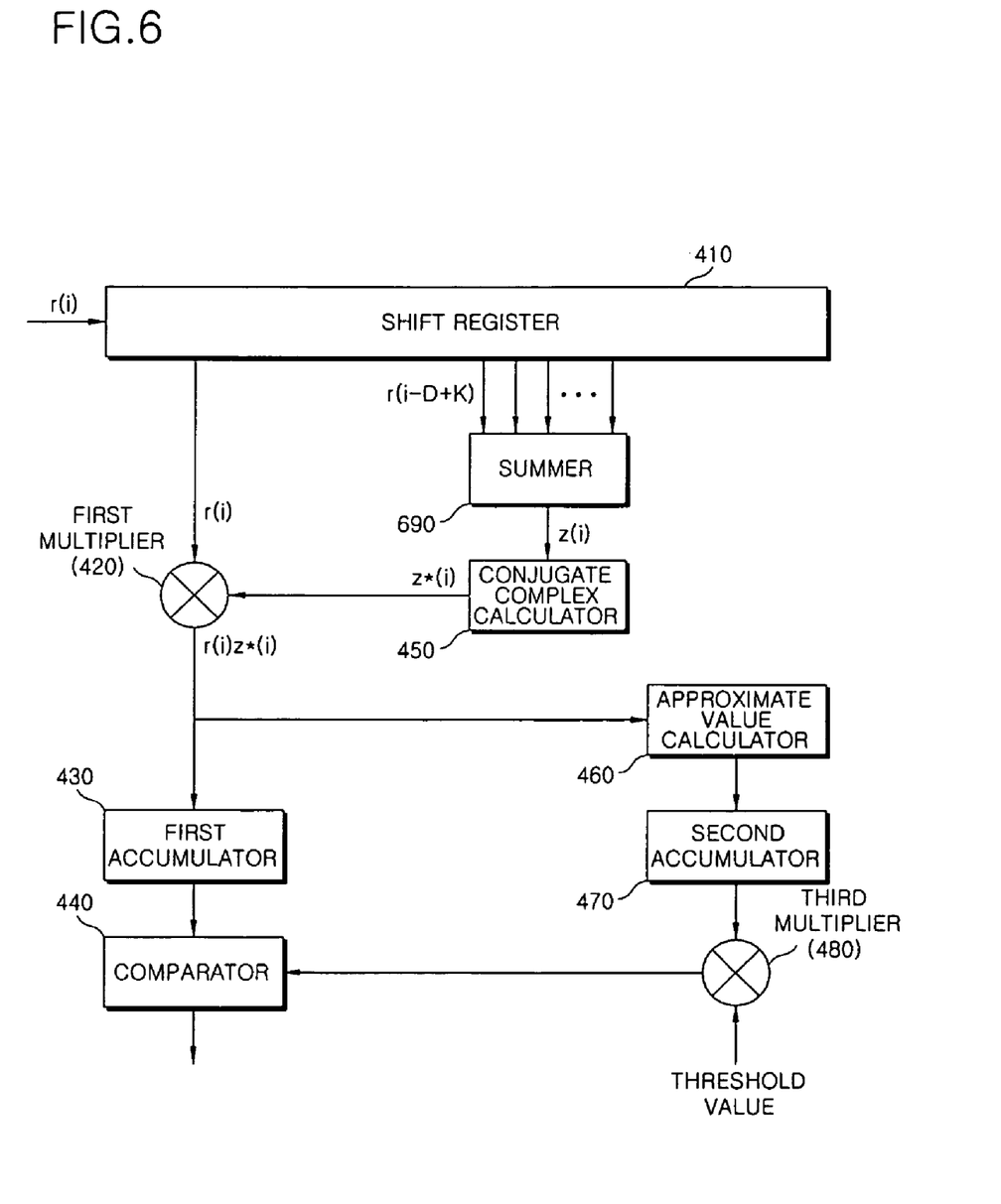
FIG. 6 is a block diagram of a third embodiment of a minute oscillation detector according to an embodiment of the present invention.

FIG. 6 is a block diagram of a third embodiment of a minute oscillation detector according to an embodiment of the present invention.

Loop delay occurs mainly due to delay in components such as filter. It is often difficult to exactly determine loop delay value. Thus, if the loop delay value D has an error, the minute oscillation detector shown in FIG. 4 or 5 should be modified to take loop delay into account. Thus, a signal z(i) inputted to the conjugate complex calculator 450 consists of several data according to Equation 5. With the signal z(i), an autocorrelation value is calculated based on Equation 6.

$$z(i) = \Sigma r(i-D+k) \quad \text{[Equation 5]}$$

$$\frac{\sum r(i)z^*(i)}{\sum |r(i)z^*(i)|} = \frac{\sum (y(i) + \alpha r(i-D)) \sum r^*(i-D+k)}{\sum |y(i) + \alpha r(i-D)) \sum r^*(i-D+k)|} \quad \text{[Equation 6]}$$

$$= \frac{\sum \left( \begin{array}{l} y(i)r^*(i-D) + \alpha r(i-D)r^*(i-D) + \\ \sum_{k \neq 0} (y(i) + \alpha r(i-D))r^*(i-D+k) \end{array} \right)}{\sum \left| \begin{array}{l} y(i)r^*(i-D) + \alpha r(i-D)r^*(i-D) + \\ \sum_{k \neq 0} (y(i) + \alpha r(i-D))r^*(i-D+k) \end{array} \right|}$$

$$\approx \alpha$$

That is, a summer 690 sums a plurality of loop delays as expressed in Equation 5. With the summed value, the amount of oscillation, α, is calculated as described in FIG. 5.

Meanwhile, in a case when the minute oscillation does not occur, the magnitude of autocorrelation value should be smaller than energy. However, if an input signal includes a DC value, a constant autocorrelation value more than an actual autocorrelation value is calculated. Thus, even though there is a noise but no input signal, the minute oscillation may be regarded to have occurred. When a noise is denoted by n(i) and a DC value is denoted by DC, i-th input data r(i) inputted to an amplifier becomes DC+n(i). At this time, the autocorrelation value and the energy are calculated based on Equation 7.

$$\frac{\sum r(i)r^*(i-D)}{\sum |r(i)r^*(i-D)|} = \frac{\sum (DC + n(i))(DC + n^*(i-D))}{\sum |(DC + n(i))(DC + n^*(i-D))|} \quad \text{[Equation 7]}$$

$$= \frac{\sum \left( \begin{array}{l} DC^2 + DCn^*(i-D) + \\ DCn(i) + n(i)n^*(i-D) \end{array} \right)}{\sum \left| \begin{array}{l} (DC^2 + DCn^*(i-D) + \\ DCn(i) + n(i)n^*(i-D) \end{array} \right|}$$

$$\approx \frac{\sum DC^2}{\sum \left| \begin{array}{l} (DC^2 + DCn^*(i-D) + \\ DCn(i) + n(i)n^*(i-D) \end{array} \right|}$$

If a DC value exists, Equation 7 results in a constant value instead of a value close to zero. Thus, the constant value (greater than the DC value) is added to the energy value to exclude effect of the DC component. Accordingly, Equation 7 results in Equation 8.

$$\frac{\sum r(i)r^*(i-D)}{\sum |r(i)r^*(i-D)| + \textit{offset}} \quad \text{[Equation 8]}$$

In Equation 8, the offset value is set such that minute oscillation does not occur even though an expected largest DC value is input. In this case, in FIGS. 4 to 6, the offset value is added to an output of the second accumulator 470.

Figure 7:
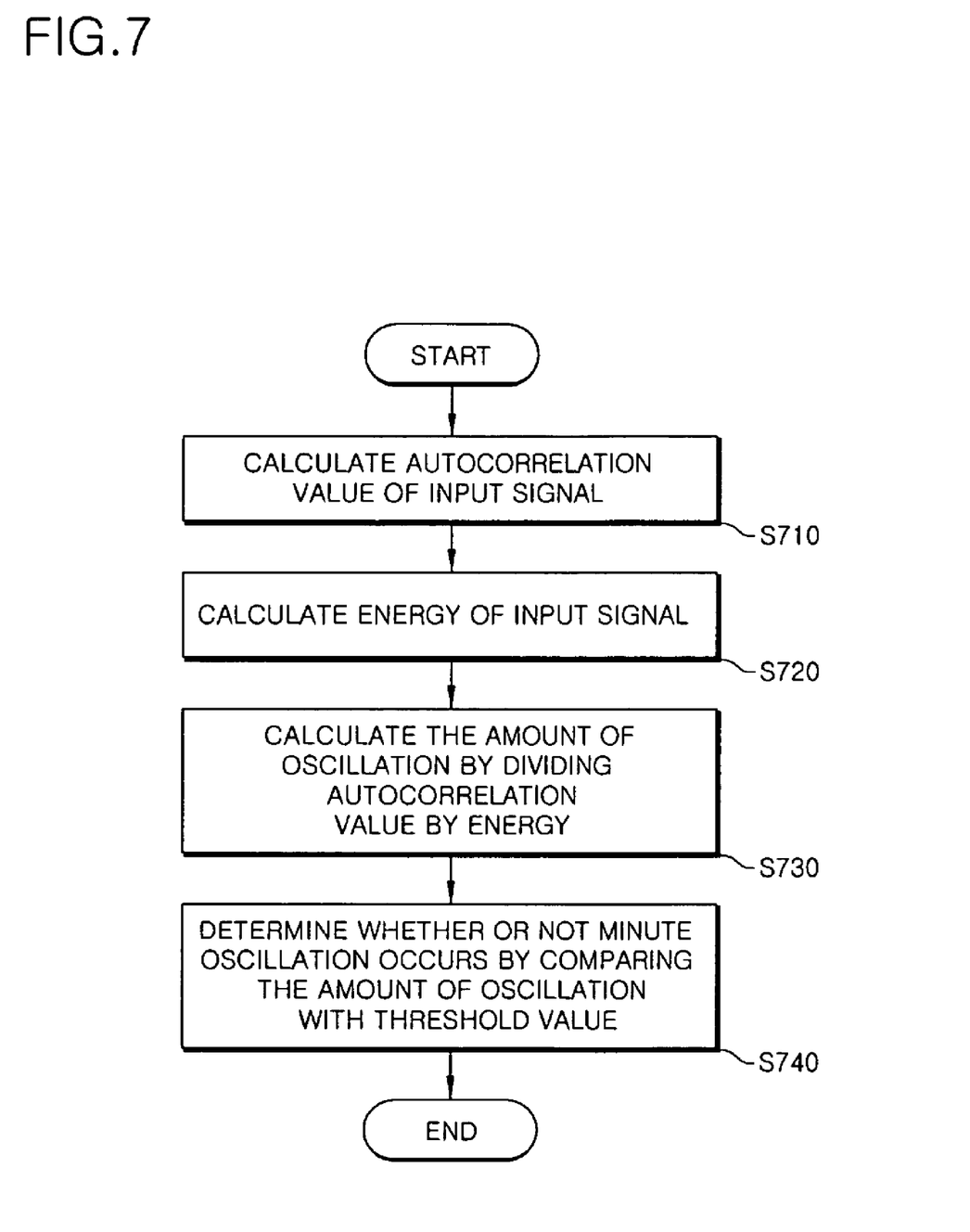
FIG. 7 is a flow chart of a method of detecting minute oscillation according to an embodiment of the present invention.

FIG. 7 is a flow chart of a method of detecting minute oscillation according to an embodiment of the present invention.

First, an autocorrelation value of an input signal is calculated (operation S710). Energy of the input signal is calculated (operation S720). The autocorrelation value and the energy are calculated based on Equations 1 to 6. The amount of oscillation is calculated by dividing the autocorrelation value by the energy (operation S730). It is determined whether or not minute oscillation occurs by comparing the amount of oscillation with a threshold value (operation S740). At this time, an approximated absolute value of a complex value can be calculated based on Equation 4. In addition, the autocorrelation value and energy of an input signal having several loop delays can be calculated based on Equation 5. Further, an input signal having a DC value can be calculated based on Equations 7 and 8.

The above-mentioned method of detecting minute oscillation may be written with computer programs. Codes and code segments constituting the program can be easily deduced by computer programmers skilled in the art. In addition, the programs are stored in computer readable media and executed by computers to implement the method of detecting minute oscillation. Examples of the computer readable media include magnetic recording media, optical recording media, and carrier wave media.

As apparent from the above description, it is possible to determine whether or not minute oscillation occurs on uplink data as well as preamble without knowing information concerning an input signal. In addition, it is possible to reduce the number of multipliers by using an approximated complex number. Further, it is possible to correctly determine whether or not the minute oscillation occurs even though loop delay is exactly unknown.

While the present invention has been described with reference to exemplary embodiments thereof, it will be understood by those skilled in the art that various changes in form and details may be made therein without departing from the scope of the present invention as defined by the following claims.

What is claimed is:

1. A method of detecting minute oscillation in a WiBro repeater, comprising:
    calculating an autocorrelation value of an input signal inputted to the repeater;
    calculating energy of the input signal;
    calculating the amount of oscillation by dividing the autocorrelation value by the energy; and
    comparing the amount of oscillation with a predetermined threshold value to determine whether or not the minute oscillation occurs in the repeater.

2. The method of claim 1, wherein the operation of calculating an autocorrelation value calculates the autocorrelation value by using the input signal inputted to the repeater and a delay signal due to a delay in the repeater.

3. The method of claim 1, wherein the operation of calculating energy calculates the energy by calculating an absolute value of a delay signal due to a delay in the repeater.

4. The method of claim 1, wherein the operation of calculating energy calculates the energy by adding a maximum value among absolute values of real and imaginary parts of a complex number, and a value obtained by dividing by a predetermined value a minimum value among the absolute values of real and imaginary parts of the complex number.

5. The method of claim 4, wherein the operation of calculating energy calculates the energy by obtaining an approximated absolute value based on the following equation:

$$|I+jQ|=\max\{|I|,|Q|\}+\min\{|I|,|Q|\}/4.$$

6. The method of claim 1, wherein, in consideration of a plurality of loop delays in the repeater, the operation of calculating an autocorrelation value and energy calculates the autocorrelation value and energy by receiving a plurality of delayed outputs.

7. The method of claim 1, wherein, in consideration of the input signal containing a DC value, the operation of calculating energy calculates the energy and then adds an offset value larger than the DC value.

8. An apparatus for detecting minute oscillation in a repeater, comprising:
    a shift register;
    an autocorrelation calculator calculating an autocorrelation value of an input signal inputted to the shift register;
    an energy calculator calculating energy of the input signal; and
    a determination unit calculating the amount of oscillation by dividing the autocorrelation value by the energy, and comparing the amount of oscillation with a predetermined threshold value to determine whether or not the minute oscillation occurs in the repeater.

9. The apparatus of claim 8, wherein the autocorrelation calculator calculates the autocorrelation value by using the input signal inputted to the shift register and an output signal obtained from the input signal passing through the shift register.

10. The apparatus of claim 8, wherein the energy calculator calculates the energy by calculating an absolute value of an output signal passing through the shift register.

11. The apparatus of claim 8, wherein the energy calculator calculates the energy by adding a maximum value among absolute values of real and imaginary parts of a complex number, and a value obtained by dividing by a predetermined value a minimum value among the absolute values of real and imaginary parts of the complex number.

12. The apparatus of claim 8, wherein, in consideration of the input signal containing a DC value, the energy calculator calculates the energy and then adds an offset value larger than the DC value.

13. A WiBro repeater comprising the apparatus of claim 8.

* * * * *